US010601662B2

(12) United States Patent
Thwaites (10) Patent No.: US 10,601,662 B2
(45) Date of Patent: Mar. 24, 2020

(54) INTERACTION OF DEVICES IN A NETWORKED ENVIRONMENT

(71) Applicant: SPARKL Limited, London (GB)

(72) Inventor: Jacoby Michael Thwaites, London (GB)

(73) Assignee: SPARKL Limited, London (GB)

( * ) Notice: Subject to any disclaimer, the term of this patent is extended or adjusted under 35 U.S.C. 154(b) by 32 days.

(21) Appl. No.: 15/578,949

(22) PCT Filed: Jun. 2, 2016

(86) PCT No.: PCT/GB2016/051630
§ 371 (c)(1),
(2) Date: Dec. 1, 2017

(87) PCT Pub. No.: WO2016/193737
PCT Pub. Date: Dec. 8, 2016

(65) Prior Publication Data
US 2018/0176086 A1    Jun. 21, 2018

(30) Foreign Application Priority Data

Jun. 2, 2015  (GB) .................................. 1509557.3

(51) Int. Cl.
*H04L 12/24*          (2006.01)
(52) U.S. Cl.
CPC ........ *H04L 41/0886* (2013.01); *H04L 41/085* (2013.01); *H04L 41/0806* (2013.01); *H04L 41/30* (2013.01); *H04L 41/0813* (2013.01)
(58) Field of Classification Search
CPC ............. H04L 41/0886; H04L 41/0806; H04L 41/085; H04L 41/30; H04L 41/0876; H04L 41/0883; H04W 84/18; H04W 84/28021
See application file for complete search history.

(56) References Cited

U.S. PATENT DOCUMENTS 7,461,130 B1 * 12/2008 AbdelAziz ............ H04W 84/20
                                                   709/208
9,524,192 B2 * 12/2016 van Velzen ........... G06F 9/5038
(Continued)

FOREIGN PATENT DOCUMENTS

EP        1179928 A2    2/2002
WO    WO-2009/056844 A1   5/2009

OTHER PUBLICATIONS

Behringer, M. et al. An Autonomic Control Plane (ACP) draft-ietf-anima-autonomic-control-plane-12, ANIMA WG, 106 pages (2017).
(Continued)

*Primary Examiner* — Patrice L Winder
*Assistant Examiner* — Aye M Aung
(74) *Attorney, Agent, or Firm* — Choate, Hall & Stewart LLP; William R. Haulbrook; Alexander D. Augst (57) ABSTRACT

A method of autonomic organisation of network nodes is described. A first node is adapted to adopt a node role. The first node communicates with other network nodes over a stateless medium. The first node is provided with a pattern of complementary operations for operation between one node role and another node role. On adopting the node role in the network, the node interacts with a second node over the stateless medium according to the pattern of complementary operations between the node role of the first node and the node role of the second node. This approach may be used in autonomic networking. Suitable devices and software to implement this approach are described.

20 Claims, 6 Drawing Sheets

(56) References Cited

U.S. PATENT DOCUMENTS

| | | | |
|---|---|---|---|
| 2007/0271276 A1* | 11/2007 | Allen | G06Q 10/06 |
| 2007/0288883 A1* | 12/2007 | Soroker | G06F 8/20 |
| | | | 717/100 |
| 2009/0260041 A1* | 10/2009 | McGinn | H04N 21/23605 |
| | | | 725/62 |
| 2010/0046531 A1 | 2/2010 | Louati et al. | |
| 2010/0180016 A1* | 7/2010 | Bugwadia | G06F 9/4411 |
| | | | 709/220 |
| 2011/0142051 A1* | 6/2011 | Bhatt | H04L 41/0853 |
| | | | 370/392 |
| 2012/0320766 A1* | 12/2012 | Sridhar | H04W 24/02 |
| | | | 370/252 |
| 2014/0201516 A1* | 7/2014 | Bjarnason | H04L 45/64 |
| | | | 713/150 |
| 2014/0215580 A1 | 7/2014 | Behringer et al. | |
| 2014/0330985 A1* | 11/2014 | Wong | H04L 45/021 |
| | | | 709/242 |

OTHER PUBLICATIONS

International Search Report for PCT/GB2016/051630 (Interaction of Devices in a Networked Environment, filed Feb. 6, 2016), issued by ISA/EPO, 5 pages (dated Aug. 24, 2016).

Ross-Talbot, S. et al., Web Services Choreography Description Language: Primer, W3C (2006), <https://www.w3.org/TR/ws-cdl-10-primer/>. Retrieved on Nov. 30, 2017.

Search Report for GB 1509557.3 (Interaction of Devices in a Networked Environment, filed Jun. 2, 2015), issued by UK IPO, 1 page (dated Dec. 7, 2015).

Written Opinion for PCT/GB2016/051630 (Interaction of Devices in a Networked Environment, filed Feb. 6, 2016), issued by ISA/EPO, 5 pages (dated Aug. 24, 2016).

* cited by examiner

INTERACTION OF DEVICES IN A NETWORKED ENVIRONMENT

FIELD OF INVENTION

The invention relates to interaction of devices in a networked environment, and particularly to the use of approaches that allow expression of more than one type of sequenced events, particularly both events that have a single point of control and no single point of control. Embodiments are applicable to autonomic networking and to methods, software and apparatus to allow nodes to perform autonomic networking in a network environment.

BACKGROUND OF INVENTION

The aim of autonomic networking is to achieve self-configuring nodes which can adapt to different environments and minimise human intervention throughout their lifecycle. Conventionally, when a human configures a router or other piece of infrastructure, s/he will always adapt to the environment into which the kit is being placed.

Thus different pieces of equipment implicitly play different roles in an infrastructure—even if they are physically or virtually identical—just because they are configured differently by network engineers. These hand-crafted configurations are complex and can be error-prone. This means changes, improvements and fixes can be complicated and slow to test and roll out.

It is for this reason, in part, that the devops movement which prescribes software-defined configuration for service automation is gaining momentum. For example, the configuration of compute nodes may be specified by configuration management tools such as Ansible, or Puppet, through models. The decision to change the configuration of these nodes may be made by an operator, or autonomically according to some (node or system-wide) closed-loop control effecting a sense, plan, act cycle.

Today's approach to device configuration undermines three key features of a successful business:
1. Agility
    Killed because human intervention is slow and too late.
2. Optimisation
    Limited by the skill of individual humans acting on retrospective analytics.
3. Compliance
    Security and audit holes abound in manually-produced configurations, imperfectly applied.

Autonomic networking seeks to mitigate this problem by allowing individual devices to self-configure as part of an autonomic domain, and minimise human intervention throughout their lifecycle.

A key part of autonomic networking is the process by which a newly installed piece of equipment advertises its presence, and receives authorisation to communicate, via a proxy, with a registrar such that it can enroll in the registrar's configuration domain.

This much has been designed already.

But let us consider this process—where each device plays a part by receiving and transmitting data. The process may depend on various factors such as what the device capabilities are, whether it was the first to be switched on, and so on.

There are two means by which this process can be made to happen:

The first, here termed "Orchestration", is when a sequence of events is driven through a single point of control—for example, a device running a program written for the purpose of controlling the others. The term orchestration is most commonly used when talking about standing up environments such as Linux containers, SQL databases and so forth, ready to run some application or other. Most of today's orchestration is hand-crafted coding. But higher-level orchestration tools exist for various specific application areas, such as BPEL, APIC-EM, Chef, Puppet and Juju. They allow us to define policies of one kind or another, perhaps including flowcharts, and they handle the detail for us.

The second approach, here termed "Choreography", is where there is no central point of control driving the sequence of events. Each device does its own thing, including collaborating with others, without a central controlling program. Choreographies are common throughout the internet. One degenerate case is when a client makes a request on a server and gets a reply. But suppose that server, in turn, makes requests on other servers before delivering its reply? Then the choreography is more complex. No single point of control exists for the global pattern of events in this case.

Effective autonomic networking requires that the model of device behaviour supports both orchestration and choreographic processes effectively. By behaviour, we mean the pattern of events that occur in respect of a given device. It should be noted that effective support for both orchestration and choreography is significant not only for autonomic networking, but also for other processes that require some measure of self-organisation in a network environment.

SUMMARY OF INVENTION

In a broad aspect of the invention, a single abstraction is used to express both orchestration and choreography such that both internal behaviour and external interactions of a node in a network can be designed, tested and changed together.

In a first aspect, the invention provides a method of autonomic organisation of network nodes comprising: providing a first node adapted to adopt a node role and communicating with other network nodes over a stateless medium, wherein the first node is provided with a pattern of complementary operations for operation between one node role and another node role; wherein on adopting the node role in the network, the node interacts with a second node over the stateless medium according to the pattern of complementary operations between the node role of the first node and the node role of the second node.

This approach can be employed in autonomic networking in which case the first node may adopt a node role on self configuration in the network. It may also be used in other types of interaction between nodes that require choreography. These patterns of complementary operations can be provided by autonomic service agents within a configuration tree. Such a configuration tree can be provided by the present applicant's SPARKL Sequencing Engine—operating principles of such a sequencing engine are set out in EP 1179928 entitled "Information Routing" and the operation of such an embodiment are provided below.

In embodiments, the first node is provided with a configuration tree, wherein node roles are defined in separate leaves of the configuration tree. A leaf defining a node role may define the pattern of complementary operations between that node role and other node roles, and the leaf may define separately orchestrated functions with a central point of control and choreographed functions with no overall point of control.

In further aspects, code to enable a node to self-configure in an autonomic network and a computing device adapted to operate as a node designed for self-configuration in an autonomic network are also provided.

SPECIFIC EMBODIMENTS OF THE INVENTION

Embodiments of the invention will now be described, by way of example, with reference to the Figures, of which.

Terms used in the specification may be further defined in the text or in the Glossary below.

The embodiments described in detail below use the SPARKL Sequencing Engine, which provides an abstraction over aspects of autonomic networking including nodes, the control plane, intent, and service agents. The (autonomic) control plane, intent, and (autonomic) service agents are described in greater detail below. Covering both the internal and external behaviour of service agents, use of SPARKL means autonomic networks can adapt to new, custom or changing environments that exhibit different capabilities or intents. This also opens up the capability for customers to define their own autonomic behaviours on their infrastructure, which could easily extend up into the business domain. Autonomic control is part of an approach to service automation which is becoming more prevalent, where SPARKL can be deployed naturally to effect the closed-loop control autonomics.

As indicated above, embodiments of the invention address choreographies, rather than simply orchestration. One exemplary use case is the enrollment of a new device into a configuration domain. In considering autonomic networking, it is desirable to consider the different roles that may need to be performed by a node—three roles may be provided in this first use case, which are:
1. New Device
   a. Newly switched on and unconfigured
   b. Broadcasts its presence and awaits a temporary certificate
   c. Uses the temporary certificate during an enrollment process.
2. Proxy Device
   a. Issues a temporary certificate to allow direct communication with a new device.
   b. Passes calls through to the Registrar Device when appropriate.
3. Registrar Device
   a. Maintains a database of devices.
   b. Issues new domain certificates when requested via the proxy.

The interaction between the three device types is implicit in the individual behaviour of each device over the common stateless medium of IP. In embodiments, a device to take on different behaviours depending on its role, with the role being defined in embodiments by an autonomic service agent, being the implementation of that part of an autonomic function that resides on a particular device.

In practice, we expect a device to take on different behaviours depending on its role. This enables distinction between the device itself—which may be outwardly identical to all the others and share versions of the same capabilities—and the different roles it might play during operation.

Let us look more closely at how a choreography such as the one described above actually happens, and the difficulties that start to arise.

When code that implements a distributed choreography is written by hand and released into the wild in compiled form, it is hard to change it to adapt to new circumstances. This is because very low-level abstractions are used:
1. The common, stateless medium is IP.
2. The role played by a device (such as Registrar) is implicit in compiled C code.

Yet new circumstances arise non-stop and should obviously be allowed for in each individual installation—without compromising the autonomic capability.

For example, suppose we are installing these devices in a wind farm, and the state of the wind turbine needs to be taken into account? Now we have a new device type injected into the mix with its own roles. For example:

| Device Type | Roles |
| --- | --- |
| Intelligent Wind Turbine | Primary |
| | Secondary |
| Intelligent Networking Switch/Router | NewDevice |
| | ProxyDevice |
| | RegistrarDevice |

With hard coded behaviours, we can't deal with this new situation as it was not considered when the firmware was compiled.

A significant consideration is that the internal behaviour of a device is different depending on the role it plays. The present inventors have appreciated that a device cannot effectively have a variable set of external behaviours if it has only a fixed set of internal behaviours. Conventionally, a fixed set of internal behaviours is hard-coded, and these directly correspond to a fixed set of external behaviours—this is firmware. Each behaviour is implicit in compiled code, and likely referenced in configuration by, say, a property value that says "Right now this device is a Registrar". It is not possible to configure the device to perform in some new choreography unless it just so happens that a pre-existing internal behaviour fits perfectly into the new external pattern of events.

Let us examine how external behaviour—that is, the pattern of events between devices—can occur. Grouped first by how the external behaviour happens, and second whether the internal behaviour of participating devices can be changed, external behaviour can occur as follows:
1) Orchestration (where external behaviour is driven by an external controller)
   a) If the set of internal behaviours is fixed, you can use external orchestration to fix up a new external pattern so the devices happen to work in a new environment.
   b) If the set of internal behaviours is variable, then you can configure both them and the external orchestration to be optimal in a new environment.
2) Choreography (where external behaviour is not driven by an external controller)
   a) If the set of internal behaviours is fixed, you are stuck with a fixed set of external behaviours too.

b) If the set of internal behaviours is variable, you can adjust the internal behaviours to achieve a new external choreography such that the devices work in a new environment.

2b) suggests that the prerequisite of variable external choreography is variable internal behaviour.

In the language of autonomic networking, this means that for ASAs to participate in different choreographies, they must themselves be mutable. This cannot possibly take the form of new firmware each time. Embodiments of the invention take a different approach.

Embodiments using SPARKL can express variability in internal behaviour using a single abstraction that can express anything from topology, through services and components, to capabilities and intents. It infers and drives sequences of events across capabilities, sending and receiving events to and from services selected optimally at runtime to achieve a given intent.

Used to define the behaviour of ASAs, the SPARKL abstraction allows the "black-box" components within devices to be modelled—such as the configuration store, the UDP capability and so on. When operations are defined against these components as part of a particular ASA, they are orchestrated by the SPARKL sequencing engine and the result is the correct behaviour for the ASA. SPARKL, installed inside each device as part of the firmware, allows the device to provide with any combination of ASAs through a single configuration upload. However, this configuration also allows a choreography to be expressed, too. In this case, SPARKL doesn't drive the external behaviour, but models it using the idea of "dancing partners"—these are expressions of a pattern of complementary operations for operation between one node role and another node role, forming mirrored pairs between interacting node types. The resulting global model can be executed and tested.

Figure 2:
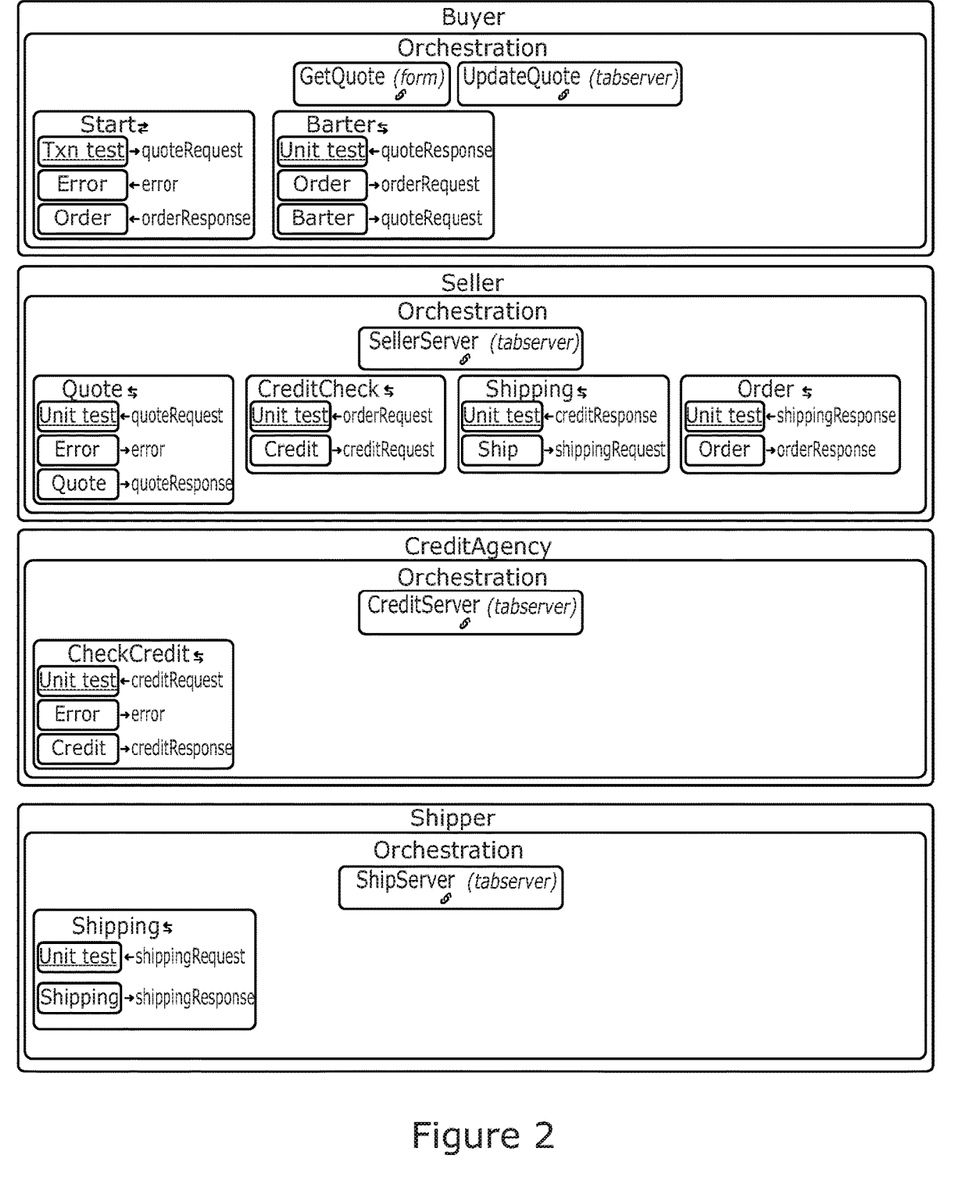
FIG. 2 shows an orchestration between different actors using a prior art approach.

FIG. 2 shows an example of orchestration as achieved by SPARKL using the method substantially disclosed in EP 1179928 but with the addition of an operation type we call Solicit-Response.

In this example, a single orchestration is defined across four services: a buyer, a seller, a credit agency and a shipper. In this first orchestration, the sequence of operations is driven by the SPARKL Sequencing Engine in a single execution environment. But a single, centrally-driven orchestration of this kind will not be possible if the four parties do not share a single execution environment.

In one embodiment of this invention, we can now transform this single orchestration into a choreography across four independent orchestrations—where each party uses the same abstraction but they do not share a single execution environment.

The method of transforming an orchestration into a choreography is shown in the following steps, with an example useful for understanding the method provided below each step;

1. Build an orchestration mix with a folder per partner, for example:
   Mix
     Partner1Folder
       Operations such as request/reply
     Partner2Folder
       Operations such as request/reply 2. Change top-level mix into a folder, change each partners folder into a mix, for example:
   Folder
     Partner1Mix
       Operations such as request/reply
     Partner2Mix
       Operations such as request/reply 3. In each Partner Mix, create a subfolder for each partner, for example:
   Folder
     Partner1Mix
       Operations such as request/reply
       Partner2Folder
     Partner2Mix
       Operations such as request/reply
       Partner1Folder 4. In each PartnerMix, move request/reply operations down into the corresponding PartnerFolder where the operation needs to be on that other partner, for example:
   Folder
     Partner1Mix
       Operations such as request/reply
       Partner2Folder
         Request/reply A
     Partner2Mix
       Operations such as request/reply
       Partner1Folder
         Request/reply B 5. Finally, for each of those moved request/reply or consume/reply operations, create a matching, mirrored solicit/response, for example:
   Folder
     Partner1Mix
       Operations such as request/reply
       Partner2Folder
         Request/reply A
         Solicit/response B
     Partner2Mix
       Operations such as request/reply
       Partner1Folder
         Request/reply B
         Solicit/response A By performing the above steps, a single orchestrated mix is transformed into many independently orchestrated mixes which communicate through mirrored operations known as "dancing partners".

Figure 3A:
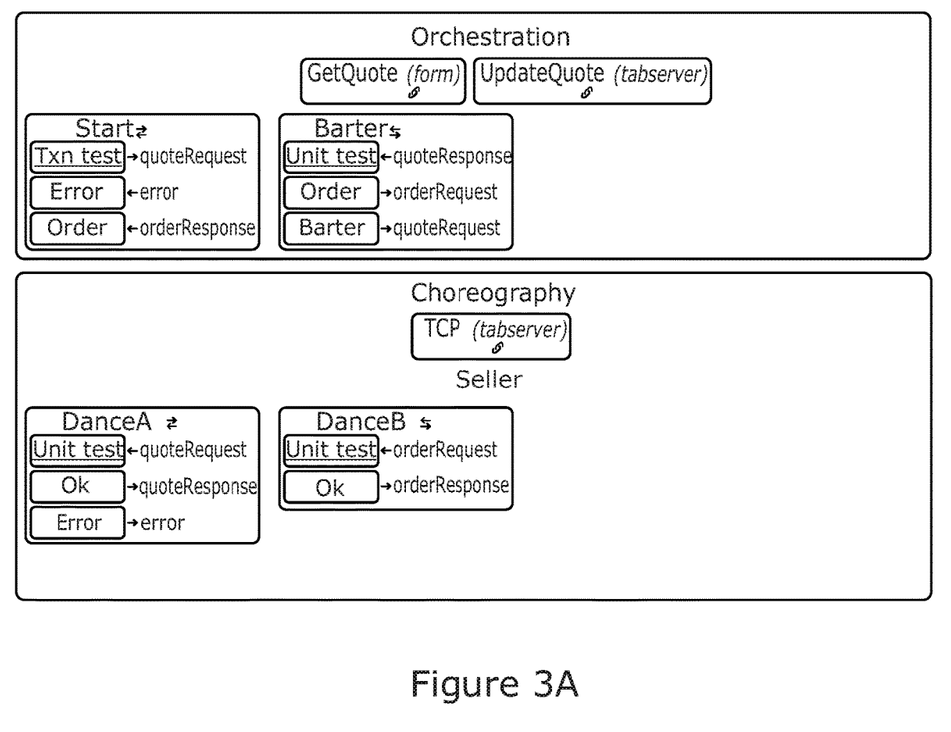
FIGS. 3A to 3D show adaptation of the orchestration of FIG. 2 into a choreography according to an embodiment of the invention.

The Buyer's independent orchestration now appears as follows with the addition of two "dance steps" with the Seller this is shown in FIG. 3A. Notice that the operations in the Buyer's orchestration folder are completely unchanged.

Figure 3B:
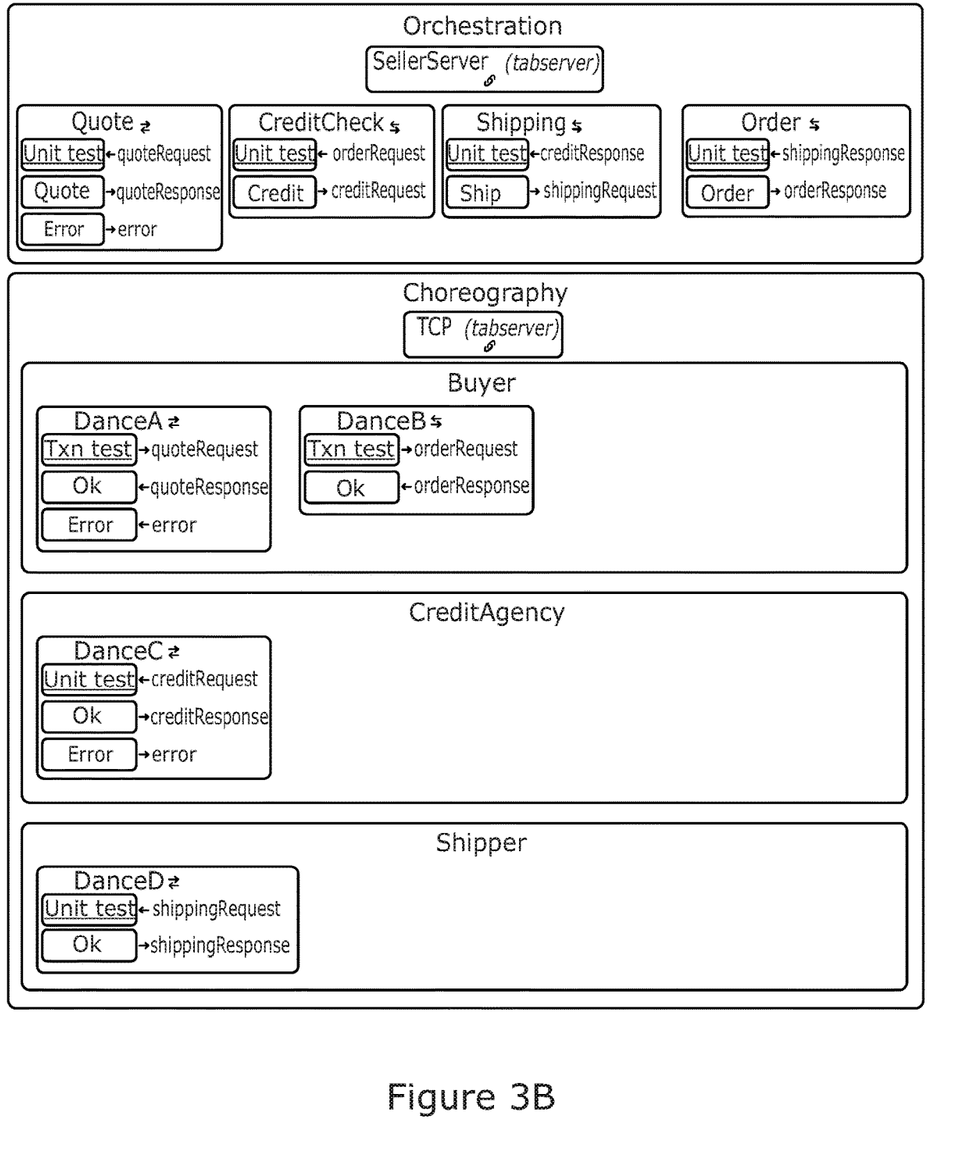

The Seller's independent orchestration now appears as follows, with the addition of two dance steps DanceA and DanceB which are an exact mirror of the Buyer's steps. There is also one dance step with each of the Credit Agency (DanceC) and the Shipper (DanceD) this is shown in FIG. 3B. Again, notice that the Seller's orchestration folder remains completely unchanged.

Figure 3C:
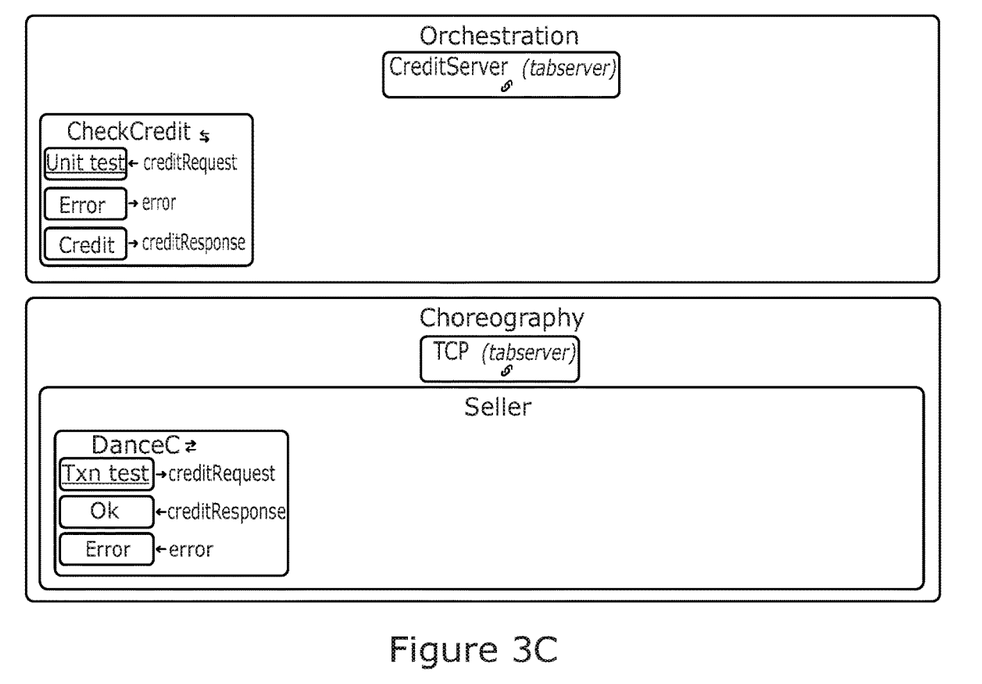

The Credit Agency's independent orchestration now appears as follows, with the addition of one dance step with the Seller, as shown in FIG. 3C.

Figure 3D:
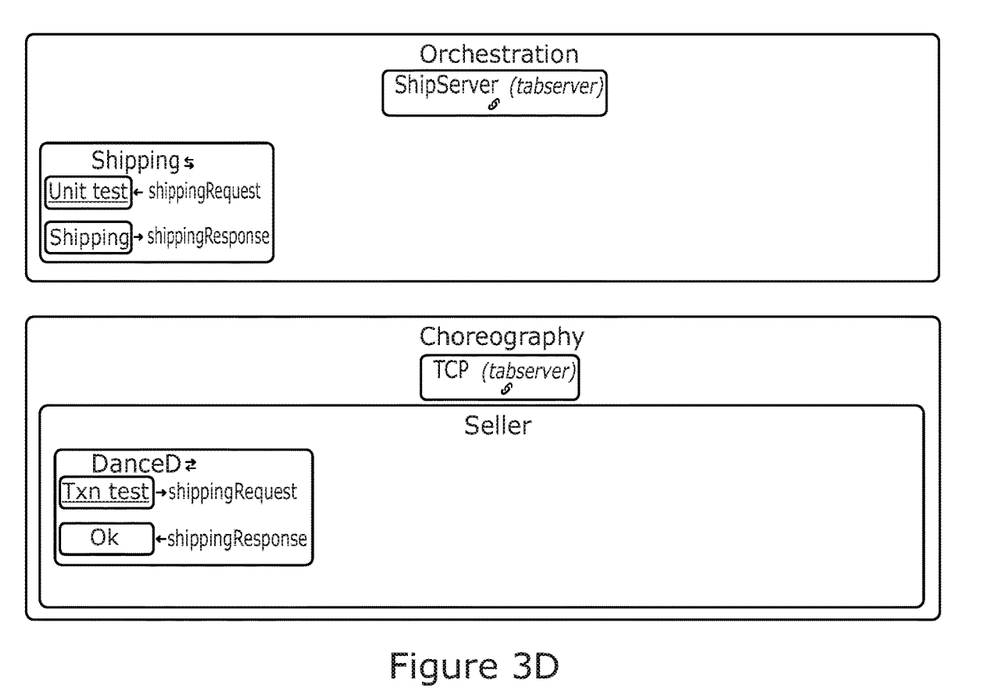

Finally, the Shipper's independent orchestration now appears as follows, with the addition of one dance step with the Seller, as shown in FIG. 3D.

In a SPARKL implementation, each independent orchestration can be the dancing partner of one or more other orchestrations. Each orchestration represents a separate execution environment, as will be the case with, for example, four separate businesses.

Dance steps express choreographic event flows over a stateless (unorchestrated) medium, expressed in this example as TCP/IP (i.e. the internet). A Dance step is a pair of operations, where the operation in one orchestration is the exact mirror of an operation in another orchestration.

Operation types in SPARKL divide neatly into pairs of mirrors—enabling a stateless medium between each pair.

In practice, we can either use a real medium like UDP or the ACP (see below), or a simulation built using, say, browser local storage to achieve the execution and testing of the global model. The Autonomic Control Plane (ACP) is discussed at https://datatracker.ietf.org/wg/anima/documents/

Since dancing partners work across a stateless medium, this may be the right way to consider the ACP in our model. In the reference above, the ACP is described as a stateless abstraction below the level of Autonomic Service Agents, but with a richer capability when compared to say UDP.

For example, distribution of Intent is seen as a function of the ACP.

A SPARKL implementation allows mixed-mode configuration. By this we mean that the SPARKL abstraction allows a single configuration to express any combination of orchestration and choreography, across both internal and external behaviours, associated with multiple roles taken by multiple device types.

An alternative approach to modelling choreography is the Web Services Choreography Description Language (WS-CDL). WS-CDL models the un-orchestrated flow of events between components. Rather like a data constraint language such as XML Schema or YANG, it is an event constraint language intended to validate actual flows, and to raise exceptions when a flow goes wrong (e.g. a component system acts incorrectly). A primer for WS-CDL setting out further examples of choreographies is found at http://www.w3.org/TR/ws-cdl-10-primer/.

Another alternative is provided by the Business Process Execution Language (BPEL), which is a programming language designed to deal with the high-level orchestration of components. Thus BPEL might be used to create components, whose choreography can then be modelled and hopefully constrained by WS-CDL.

In practice, the result of this approach is large, unwieldy and painfully complex to use. Because the orchestration that defines internal behaviour is wholly different from the abstraction that seeks to constrain the choreography between components, the combination fails to bridge the chasm between the design of an individual component (such as an autonomic service agent), and the design of a distributed system (such as an autonomic domain) of which it forms part.

In embodiments of the present invention, the behaviour of devices acting in, say, a datacenter could be represented as a single SPARKL configuration tree, factored into parts to suit the author or designer.

A single configuration tree is used to represent:
1. The common stateless medium over which choreography occurs, e.g. UDP.
2. The virtual or physical devices themselves.
3. The service components exposed by each device.
4. The internal orchestration of each role played by a device.
5. Different roles played by different devices yet responding to the same intent.
6. The external choreography of the ASAs within devices.

To achieve useful autonomic behaviour, it is not possible for a single configuration to accurately model a wind farm, a datacenter, an aircraft, a fleet of vans and so on. It also cannot be determined in advance what devices may come into existence or what their capabilities might be. The approach taken in embodiments of the present invention is rather that each new environment type has a templated, global configuration tree that is more or less similar to one previously designed.

Thus we could have one configuration tree, for example, for representing network router devices and their various behaviours for deployment in, say, a datacenter.

We could have a different configuration tree for representing not only network router devices but also additional devices such as wind turbines and their respective behaviours for deployment in a wind farm. If the wind turbine device internal behaviours cannot be changed, then we can achieve the right choreography by adjusting the internal behaviours of the SPARKL-capable devices.

Figure 1:
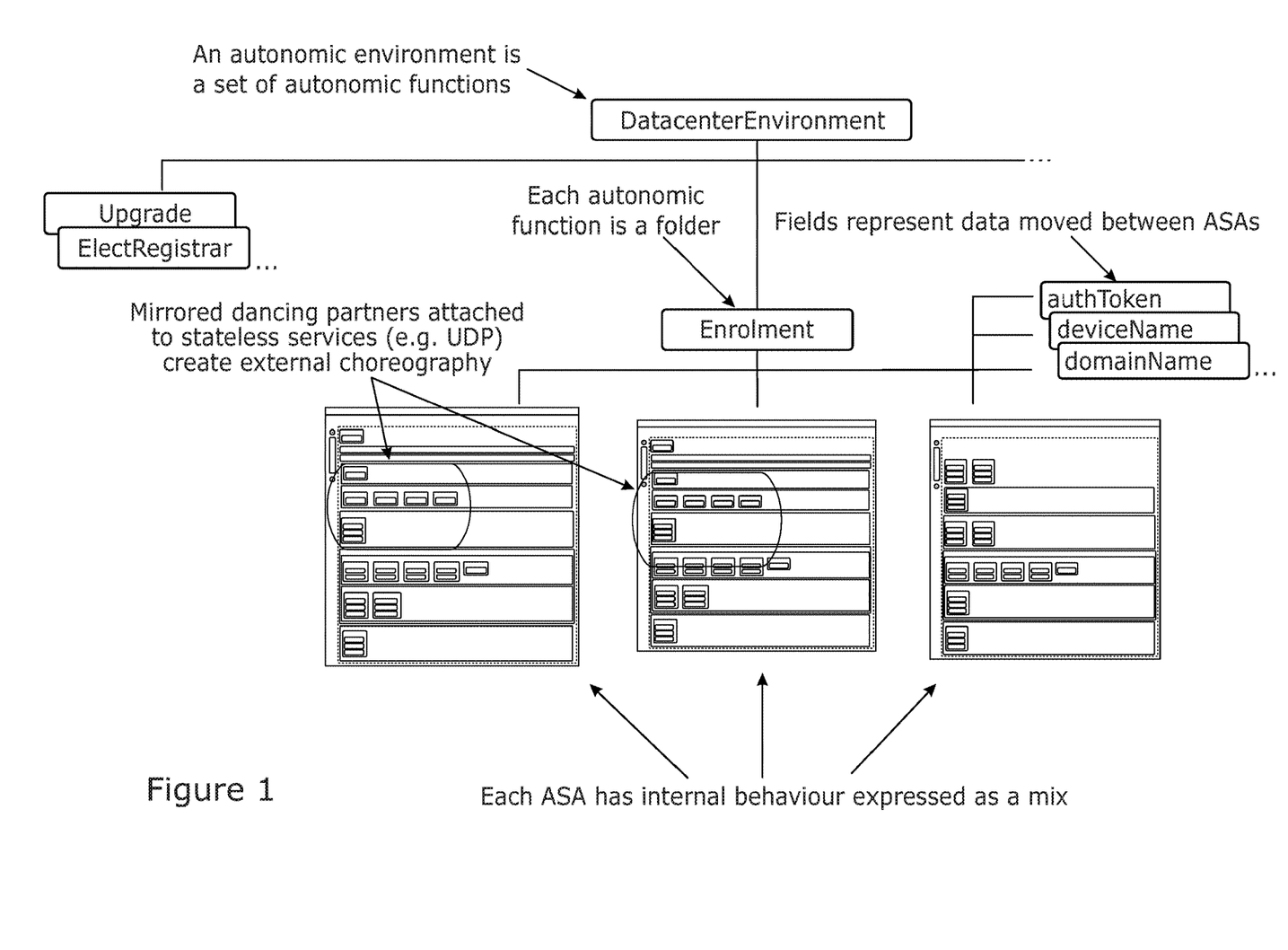
FIG. 1 shows an exemplary configuration tree according to an embodiment of the invention.

An exemplary configuration tree is provided in FIG. 1. The tree is a single configuration that is common to all the devices which are intended to be part of a given autonomic domain. This might be pre-loaded into the device, or we could pre-load a generic bootstrap autonomic function. Thus the exact same physical devices can obey different behaviours in different environments (for example, a wind farm or other customer-specific environment).

FIG. 1 also illustrates an exemplary autonomic service agent (ASA) and its operation in more detail. In the example, the autonomic function called Enrolment has been expanded to show how:
1. Each ASA is packaged as a SPARKL mix (i.e. a configuration tree fragment authored as XML, JSON or YAM L). This config may be constrained by XML schema, or by an alternative such as a YANG schema.
2. The SPARKL Sequencing Engine drives the ASA mixes.
3. External behaviour not driven by SPARKL is expressed by mirrored dancing partners in different mixes (there can be more than 2 partners, depending on the operation pattern).
4. Unit tests can be conducted against individual operations, and functional tests against the transactions defined in each ASA mix.
5. All operations across the environment are logged, providing a consistent audit trail which can be used to support regulatory, technical or business needs.

In embodiments, each ASA mix is made up of operations defined using the SPARKL abstraction. These are linked to services, written in code, whose functionality is fixed (e.g. in firmware or other loaded program).

In embodiments, Device Service Wrappers may be used to wrap specific device components so the components can benefit from the SPARKL service abstraction—which allows them to interrogate meta-data about the operation(s) that are defined on them at runtime.

For example, there may be a service wrapper called Config that wraps the particular device's configuration parameter store. This wrapper may be custom-written for the device and component, and use SPARKL configuration metadata to drive its runtime behaviour. When that Config service receives a request event against a request-reply operation whose pattern and properties identify it as a parameter lookup, it duly looks up the parameter value(s) and outputs the configured reply field(s).

In this way we are able to wrap black-boxes of built-in, immutable device functionality with service wrappers whose (possibly stateless) actions are driven entirely by markup in the SPARKL configuration tree. These "black boxes", when contained in the "glass box" of a SPARKL mix, are sufficient to allow any ASA internal behaviour to be designed, unit tested and behaviour-tested.

Figure 4:
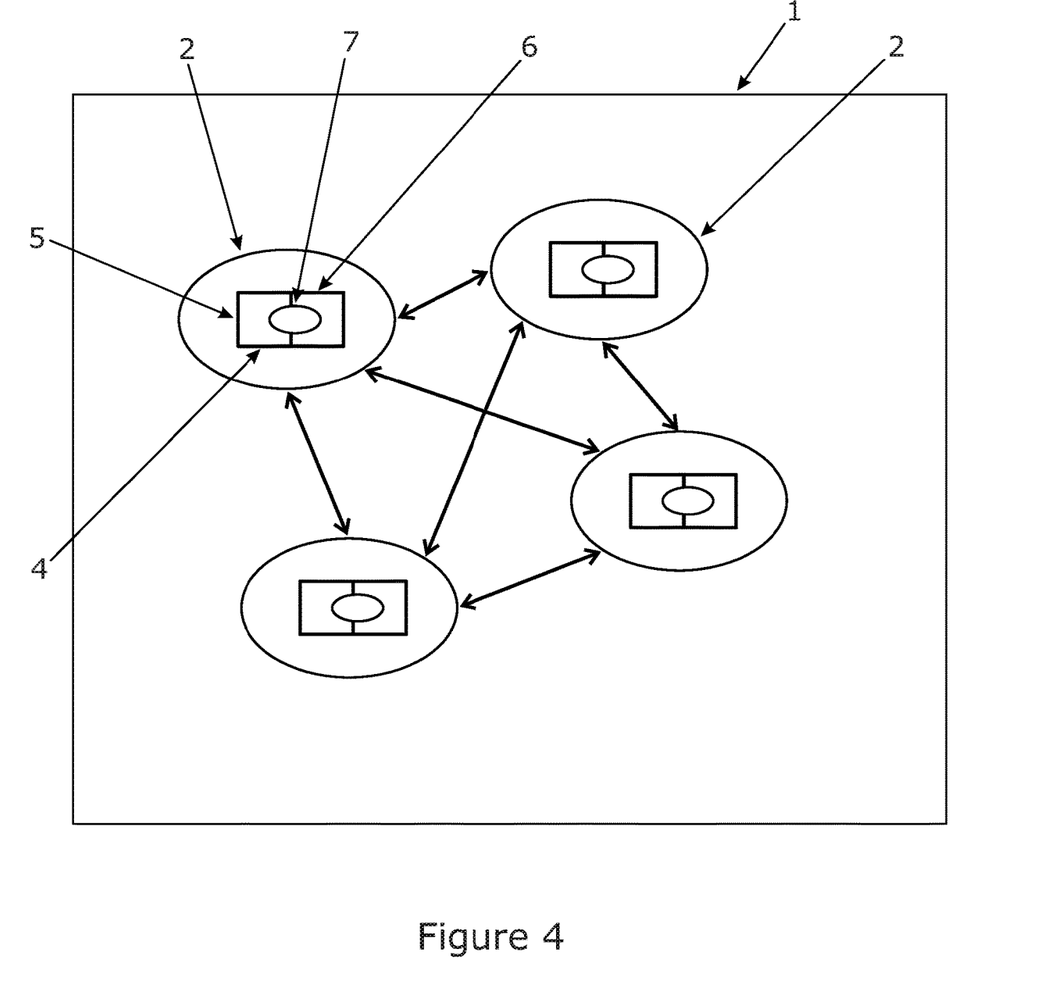
FIG. 4 illustrates schematically a system in which embodiments of the invention may be implemented.

Use of this approach in a domain is shown in FIG. 4. A domain 1 is shown comprising autonomic nodes 2—this domain may be a computer network and the nodes discrete devices adapted for autonomous routing, and any appropriate context could be considered (such as the example indicated above of a wind farm comprising a plurality of turbines). The autonomous nodes have a computing environment 4 defined by a processor 5 and a memory 6, with the autonomic node implementation 7 (comprising a configuration tree and service agent as discussed above). Where associated with a physical device, the node itself may within the physical device to which it relates, or it may be physically separate from it but in communication so that it can determine behaviour for that physical device. Nodes may also be formed within a shared computational environment. The nodes 2 here are shown as having formed networking connections with other nodes 2. The stateless layer for interaction between nodes is supported by the domain 1.

As noted, the ACP is a stateless layer providing authentication and control events to all nodes in a given autonomic domain. A simple way to expose this layer so it can be used within ASA behaviours is through a thin service wrapper capable of supporting simple operations through the SPARKL configuration markup. One example would be the notification operation corresponding to the receipt of an ACP Intent, used to kick off the appropriate ASA behaviour in all nodes in the autonomic domain.

To achieve effective implementation, a sequencing engine such as SPARKL could be embedded within an operating system, but other approaches can be used, such as interaction with service wrappers. For example, these service wrappers could run in the SPARKL execution environment, from where they could use native methods to call out to (or interrogate) device components, by whatever means happen to be possible.

For example, if the SPARKL Sequencer runs in a UCS-E on an ISR-G2, the service wrapper in the same environment could use onePK or CLI to access the current state, or set the state, of a device component such as the configuration store. This also allows provision of services that expand built-in functionality, or which are completely new (such as an expression evaluator, a new form of communication, or an ACP implementation).

| | Glossary |
|---|---|
| Autonomic Control Plane (ACP) | A relatively high-level, stateless communication mechanism between all nodes in an autonomic domain. Key functions include distributing Intents. |
| Autonomic Domain | A collection of autonomic nodes that instantiate the same Intent. |
| Autonomic Function | A feature or function which requires no configuration, and can derive all required information either through self-knowledge, discovery or through Intent. |
| Autonomic Service Agent (ASA) | An agent implemented on an autonomic node which implements an autonomic function, either in part (in the case of a distributed function) or whole. Corresponds to Role. |
| Behaviour | The flow of events in respect of a given device which has adopted a given role. |
| Choreography | The pattern of events flowing between components, where those events are not driven by a single point of control. |
| Component | Something identifiable as the source or destination of events. |
| Device | A router, switch, computer or other physical or virtual thing which can play one or more roles. |
| Event | Data moving from one component to another. |
| Intent | The means by which the ACP communicates some aspect of desired configuration to an Autonomic Domain. |

| | Glossary |
|---|---|
| Mix | The SPARKL markup that defines an orchestration. In this document, we identify an Autonomic Function with a Mix. |
| Orchestration | The pattern of events flowing between components, driven by a single point of control. |
| Role | The name of a specific behaviour of a device in relation to a particular autonomic function which may be distributed across several devices. Corresponds to Autonomic Service Agent. |

The invention claimed is:

1. A method of performing autonomic organisation of network nodes, comprising:
   selecting one or more operations from a set of operations provided in an orchestration operating in a single execution environment to create a plurality of patterns of complementary operations, with each pattern of complementary operations forming an independent orchestration, and where the created independent orchestration operates in its own separate execution environment when executed;
   providing a first network node adapted to adopt a node role and communicating with other network nodes over a stateless medium, wherein the first network node is provided with at least one of the created patterns of complementary operations for operation between one node role and a second node role and the other network nodes are each provided with at least one of the created patterns of complementary operations, and wherein;
   adopting a node role comprises the first network node selecting a pattern of complementary operations from the provided at least one created patterns of complementary operations such that the first network node is configured to interact with the another node role; and
   each pattern of complementary operations comprises a set of one or more operations which when performed enable the first network node to perform a defined function with one of the other network nodes when the other network node is provided with one or more operations which mirror those provided to the first network node; and
   wherein on adopting the node role in the network, the first network node interacts with a second network node over the stateless medium according to the pattern of complementary operations between the node role of the first network node and the second node role of the second network node.

2. The method of claim 1, wherein the autonomic organisation of network nodes comprises autonomic networking, and wherein the first network node adopts the node role on self configuration in the network.

3. The method of claim 2, wherein the first network node is provided with a configuration tree, wherein node roles are defined in separate leaves of the configuration tree.

4. The method of claim 3, wherein a leaf defining a node role defines the pattern of complementary operations between that node role and other node roles.

5. The method of claim 4, wherein the leaf defines separately orchestrated functions with a central point of control and choreographed functions with no overall point of control.

6. The method of claim 3, wherein the configuration tree is adapted to operate with a sequencing engine.

7. The method of claim 1, wherein the first network node is provided with a configuration tree, wherein node roles are defined in separate leaves of the configuration tree.

8. The method of claim 7, wherein a leaf defining a node role defines the pattern of complementary operations between that node role and other node roles.

9. The method claim 8, wherein the leaf defines separately orchestrated functions with a central point of control and choreographed functions with no overall point of control.

10. The method of claim 7, wherein the configuration tree is adapted to operate with a sequencing engine.

11. A computing domain comprising a plurality of network nodes, wherein the network nodes are provided with one or more operations selected from a set of operations provided in an orchestration operating in a single execution environment to create a plurality of patterns of complementary operations, with each pattern of complementary operations forming an independent orchestration, and where the created independent orchestration operates in its own separate execution environment when executed, and wherein the network nodes comprise:
 a first network node adapted to adopt a first node role and a second network node adapted to adopt a second node role, each network node communicating with other network nodes over a stateless medium, wherein the first network node is provided with at least one of the created patterns of complementary operations for operation between one node role and a second node role and wherein the second node role is provided with at least one of the created patterns of complementary operations, and wherein;
 adopting a node role comprises the first network node selecting a pattern of complementary operations from the provided at least one created patterns of complementary operations such that the first network node is configured to interact with the another node role; and
 each pattern of complementary operations comprises a set of one or more operations which when performed enable the first network node to perform a defined function with one of the other network nodes when the other network node is provided with one or more operations which mirror those provided to the first network node; and
 wherein on adopting node roles in the network, the first and second network nodes interact over the stateless medium according to the pattern of complementary operations defined between the first and second node roles.

12. The computing domain of claim 11, wherein the autonomic organisation of network nodes comprises autonomic networking, and wherein the first network node adopts the node role on self configuration in the network.

13. The computing domain of claim 11, wherein the first network node is provided with a configuration tree, wherein node roles are defined in separate leaves of the configuration tree.

14. The computing domain of claim 13, further comprising a sequencing engine, wherein the configuration tree is adapted to operate with the sequencing engine.

15. A computing device comprising a processor and a memory, wherein the computing device is adapted to:
 select one or more operations from a set of operations provided in an orchestration operating in a single execution environment to create a plurality of patterns of complementary operations, with each pattern of complementary operations forming an independent orchestration, and where the created independent orchestration operates in its own separate execution environment when executed;
 adopt a node role in a network and to communicate with other computing devices over a stateless medium, wherein the computing device is provided with at least one of the created patterns of complementary operations for operation between one node role and another node role and the other computing devices are each provided with at least one of the created patterns of complementary operations, and wherein:
 adopting a node role comprises the computing device selecting a pattern of complementary operations from the provided at least one created patterns of complementary operations such that the computing device is configured to interact with the another node role; and
 each pattern of complementary operations comprises a set of one or more operations which when performed enable the computing device to perform a defined function with one of the other computing devices when the other computing device is provided with one or more operations which mirror those provided to the computing device; and
wherein upon the computing device adopting the node role in the network, the computing device is adapted to interact with a second computing device over the stateless medium according to the pattern of complementary operations between the node role of the computing device and the node role of the second computing device.

16. The computing device of claim 15, wherein the computing device adopts a node role on self configuration in the network.

17. The computing device of claim 15, wherein the computing device is provided with a configuration tree, wherein node roles are defined in separate leaves of the configuration tree.

18. The computing device of claim 17, wherein a leaf defining a node role defines the pattern of complementary operations between that node role and other node roles.

19. The computing device of claim 18, wherein the leaf defines separately orchestrated functions with a central point of control and choreographed functions with no overall point of control.

20. The computing device of claim 17, wherein the configuration tree is adapted to operate with a sequencing engine.

* * * * *